United States Patent Office 3,239,494
Patented Mar. 8, 1966

3,239,494
LITHIUM PERCHLORATE AS CATALYST FOR VINYL POLYMERIZATIONS
Russell B. Hodgdon, Jr., Beverly, Mass., assignor to Monsanto Research Corporation, St. Louis, Mo., a corporation of Delaware
No Drawing. Filed July 2, 1962, Ser. No. 207,027
18 Claims. (Cl. 260—80.3)

This application is a continuation-in-part of copending application Serial No. 28,818, filed May 13, 1960, and now abandoned.

This invention relates to a process for the polymerization of vinyl monomers. More particularly, this invention relates to a novel catalyst for effecting polymerization of vinyl monomer.

Many vinyl monomers have been polymerized by the aid of a variety of catalytic substances utilizing the free-radical mechanism as well as the cationic mechanism of catalysis. It is very often desirable to employ a cationic type catalyst in the polymerization of monomers in order to produce higher molecular weight polymers and certain vinyl monomers can be polymerized no other way. Unfortunately, cationic type catalysts, such as the Friedel-Crafts catalysts, initiate such violent polymerization reactions with some vinyl monomers that the polymerization must be effected either at very low temperatures or in the presence of a diluent or solvent in order to control the polymerization reaction.

I have discovered that lithium perchlorate is a very suitable initiator or catalyst for the cationic polymerization of many vinyl monomers in an improved manner.

An object of this invention is to provide for cationic polymerization of many vinyl monomers in an improved manner.

Another object of this invention is to provide a novel catalyst for the polymerization and copolymerization of certain vinyl monomers in an improved manner.

Another object of this invention is to provide a process for polymerizing certain vinyl monomers in a controlled manner using a cationic type polymerization catalyst.

Another object of this invention is to provide a process for polymerizing certain vinyl monomers to obtain high molecular weight polymers and copolymers at ordinary temperatures.

Another object of this invention is to provide a process for polymerizing certain vinyl monomers to obtain high molecular weight polymers and copolymers in the absence of a diluent or solvent.

Other aspects, objects and advantages of this invention will be apparent from a consideration of the accompanying disclosure and appended claims.

According to this invention, vinyl monomers having pi electron densities greater than the pi electron density of ethylene are polymerized and/or copolymerized in an improved manner in the presence of a catalytic amount of an initiator or polymerization catalyst comprising anhydrous lithium perchlorate. Although the polymerization process of this invention involves a cationic type catalytic polymerization, the polymerization takes place at a moderate rate which is controllable without danger of a violent or uncontrolled polymerization reaction taking place. The polymerization process of this invention can be effected at ordinary temperatures, including room temperature, in the presence or absence of a solvent, to produce moderate and high molecular weight polymers and copolymers of the particular vinyl monomers noted above. Also, the novel polymerization process of this invention provides for the polymerization of certain vinyl monomers which are only slightly or difficulty polymerized using a free-radical type catalyst.

Also, according to this invention, anhydrous lithium perchlorate is provided as a novel initiator or polymerization catalyst for the polymerization and/or copolymerization of certain vinyl monomers noted above.

The lithium perchlorate catalyst of this invention is very specific in effecting polymerization and/or copolymerization reactions and other similar metal perchlorates or other similar lithium salts are ineffective in initiating these reactions. Thus, it has been found that lithium chloride, lithium bromide, and lithium carbonate, are ineffective in initiating the polymerization of vinyl monomers such as, for example, acrylamide, styrene, and vinyl n-butyl ether. Losev and Zakharova (Proc. Acad. Sci. USSR, vol. 116, p. 891 (1957); Chem. Abstr., vol. 52, p. 5025g), describe the heterogeneous polymerization of styrene at temperatures from 20 to 90° C., with anhydrous magnesium, barium, potassium and ammonium perchlorates. They obtained low to medium molecular weight polystyrenes. It is necessary that the lithium perchlorate catalyst of this invention be in substantially anhydrous form; that is, the lithium perchlorate catalyst of this invention should contain less than about 0.5 weight percent water. Lithium perchlorate trihydrate is not useful. On the other hand, it should contain detectable amounts of water. In a totally anhydrous system, the catalytic effect of the perchlorate is inhibited. Other impurities, such as perchloric acid, may be present in the lithium perchlorate catalyst of this invention without detrimental effect to initiating polymerization, and, in fact, may improve the polymerization. Lithium perchlorate for use in catalyzing the polymerization of vinyl monomers may be prepared by any of the methods known to those skilled in the art, and in addition, commercially available lithium perchlorate may be used. Preferably, the lithium perchlorate is used in the form of a finely divided solid; however, it can also be used in other forms, such as a pelleted form. The lithium perchlorate is activated for use in polymerization reactions by drying in the conventional manner to reduce the water to an amount less than 0.5 weight percent. In addition, other trace impurities present in the lithium perchlorate may also be removed if desired; however, these other trace impurities usually do not have a substantial detrimental effect on the polymeriaztion reaction. The catalyst is used in an amount as small as 1% by weight of the reaction mixture, including the solvent, if any, catalyst, and vinyl monomer.

The monomeric compounds subjected to polymerization and copolymerization by the process of this invention consist of vinyl type compounds which have high pi electron densities. Such monomeric compounds include vinyl compounds having a wide variety of functional groups such as, for example, ethers, amides, and the like, as well as a vinyl group, e.g., —CH=CH$_2$. Although the class of monomeric compounds which can be polymerized by the novel catalysts of this invention is very large, only those vinyl compounds having high pi electron densisties or a high basicity toward cationic catalysts can be used. Preferably, the vinyl compounds which can be polymerized in the process of this invention have pi electron densisties greater than the pi electron density of ethylene. A particular value for the pi electron density of ethylene cannot be stated because, as is well known to one skilled in the art, the value of the pi electron density of a compound is a statistical distribution of those electrons making up the >C=C< group and will vary in accordance with the conditions under which it is measured. However, one skilled in the art wishing to determine whether a particular vinyl compound can be polymerized using the lithium perchlorate catalysts of this invention can first measure the pi electron density of ethylene and then measure the pi electron density of the candidate vinyl monomer under the same conditions and compare the values obtained.

Examples of vinyl monomers which have high pi electron densities and which can be polymerized using the novel lithium perchlorate catalyst of this invention are as follows: vinyl isobutyl ether, vinyl n-butyl ether, 1-methoxy butadiene, 2-vinyl oxy ethanol, vinyl butoxy ethyl ether, α-methyl styrene, styrene, 4-vinyl pyridine, 4-methyl styrene, methacrylamide, acrylamide, N-methylolacrylamide and N-vinyl type monomers.

Examples of vinyl compounds which have low pi electron densities and which cannot be polymerized using the lithium perchlorate catalysts of this invention, include the following: vinyl acetate, vinyl n-butyrate, vinyl stearate, methyl methacrylate, ethyl methacrylate, n-butyl methacrylate, methyl acrylate, ethyl acrylate, Cellosolve, acrylate, methyl vinyl ketone, vinyl bromide, trichloroethylene, diethyl fumarate, diallyl maleate, maleic anhydride, and acrylonitrile.

The polymerization process of this invention can be conducted at room temperature without danger of violent or uncontrollable polymerization reactions taking place. However, the rate of polymerization will vary with the different types of vinyl monomers and low temperatures may be desirable in certain polymerizations in order to obtain polymers having particular characteristics. Ordinarily, the temperature of the polymerization reaction mixture is maintained above −20° C., although lower temperatures can be used. It is often desirable in the polymerization of certain vinyl monomers to elevate the temperature somewhat in order to increase the rate of polymerization; however, the temperature of the polymerization reaction mixture is not ordinarily increased above 150° C. even though higher temperatures can be used. Preferably, the polymerization reactions are conducted at a temperature within the range of from 0° C. to 100° C.

The polymerization process of this invention can be carried out at atmospheric pressure and ordinarily atmospheric pressure is preferred. However, it is very often advantageous to use superatmospheric pressures sometimes as high as 1000 p.s.i. or higher in order to increase the rate of polymerization with certain monomers. The polymerization reactions of this invention can be accomplished in a period of time as small as 5 minutes up to a period of time as long as 96 hours, depending upon the nature of the vinyl monomer and the reaction conditions of temperature and pressure.

It is usually desirable to carry out the polymerization reactions of this invention in an inert reaction medium or solvent; however, the use of such reaction medium or solvent is not necessary and suitable polymerizations can be carried out in bulk. The solvent, if one is used, should be one in which the vinyl monomer is soluble and it is not necessary that the lithium perchlorate catalysts be dissolved therein. Also, if high molecular weight polymer products are desired, the solvent should be one which has a high dielectric constant. Suitable solvents include the saturated aliphatic hydrocarbons such as, for example, the pentanes, hexanes, heptanes, and the like, usually containing from 5 to 12 carbon atoms; the aromatic hydrocarbons such as, for example, toluene, xylenes, ethyl benzene, trimethyl benzene, and the like; and the dialkyl ethers, such as, for example, diethyl ether, diisopropyl ether, and the like. Methyl ethyl ketone and higher homologous ketones can also be used as a solvent; however, acetone is not suitable for this purpose. Similarly, amines are not suitable as solvents for use in the polymerization process of this invention. The amount of solvent used is not critical and may be in an amount as large as the amount of polymerizable monomer.

Polymerization reactions using the novel lithium perchlorate catalysts of this invention may be performed by the polymerization of suitable vinyl monomers as defined above in either relatively high purity form or in admixture with other polymerizable vinyl monomers or non-polymerizable compounds including non-polymerizable vinyl monomers. Thus, the polymerization process of this invention can be used to form homopolymers, as well as copolymers of the defined vinyl monomers, and either inert substances or unpolymerizable substances can be present in the monomeric reactants. However, the monomeric stream to be polymerized must be substantially free of amines and water in order for the polymerization to be effective using the lithium perchlorate catalysts of this invention, and, therefore, such monomeric streams containing these impurities must be subjected to a purification process prior to polymerization.

The advantages, desirability and usefulness of the present invention are illustrated by the following examples.

EXAMPLE 1

In this example, various vinyl monomers were subjected to polymerization using a freshly dried lithium perchlorate catalyst containing from 0.05 to 0.3% by weight water. The lithium perchlorate was obtained from the G. F. Smith Company. Prior to polymerization, the vinyl monomers were distilled. In carrying out the polymerizations, 0.05 g. of the anhydrous lithium perchlorate catalyst was placed into a 25 x 10 mm. test tube into which was added 0.5 to 3.0 g. of the selected vinyl monomer and the desired solvent if one was used. The test tube was then stoppered immediately and subjected to the desired temperature by being left either at room temperature or by being immersed into a bath maintained at a desired elevated temperature. In each polymerization, an additional test tube containing a similar amount of vinyl monomer was subjected to the same polymerization conditions in order to insure that the observed polymerizations were not catalyzed by heat alone. Upon completion of the polymerization reactions, the polymers were removed from the respective test tubes, washed with 10 times the weight of polymer with water to remove perchlorates, dissolved twice in an appropriate solvent in an amount amounting to 50 times the weight of polymer, precipitated with an equal volume of appropriate non-solvent, filtered and dried at 80° C. overnight. The polymers were obtained in yields greater than 60 percent.

*Table 1*

| Vinyl Compound | Amount of Catalyst, Percent [1] | Solvent | Temp., °C. | Degree of Polymerization |
|---|---|---|---|---|
| Vinyl isobutyl ether | 2-3 | None | 60-85 | MF.[1] |
|  | 0 | do | 60-85 | N. |
| Vinyl n-butyl ether | 2-3 | do | 60-85 | MF. |
|  | 0 | do | 60-85 | N. |
| 1-methoxy butadiene | 2-3 | do | 60-85 | MF. |
|  | 0 | do | 60-85 | N. |
| 2-vinyloxy ethanol | 2-3 | do | 60-85 | MF. |
|  | 0 | do | 60-85 | N. |
| Vinyl butoxy ethyl ether | 2-3 | do | 60-85 | MF. |
|  | 0 | do | 60-85 | N. |
| α-Methyl styrene | 2-3 | do | 60-85 | S. |
|  | 0 | do | 60-85 | N. |
| Styrene | 2-3 | do | 60-85 | MF. |
|  | 0 | do | 60-85 | N. |
| 4-vinyl pyridine | 2-3 | do | 60-85 | S. |
|  | 0 | do | 60-85 | N. |
| 4-methyl styrene | 2-3 | do | 60-85 | MF. |
|  | 0 | do | 60-85 | N. |
| Merthacrylamide | 2-3 | do.[2] | RT-60 | F. |
|  | 0 | do.[2] | RT-60 | N. |
| Acrylamide | 2-3 | do.[2] | 60-85 | M. |
|  | 0 | do.[2] | 60-85 | N. |
| N-methylol acrylamide | 2-3 | do.[2] | RT-60 | M. |
|  | 0 | do.[2] | RT-60 | N. |
| Vinyl formate | 2-3 | do.[3] | 85 | S. |
|  | 0 | do.[3] | 85 | N. |
| Vinyl acetate | 2-8 | do | 85 | N. |
| Vinyl n-butyrate | 2-8 | do | 85 | N. |
| Vinyl stearate | 5 | do | 85 | N. |
| 2-vinyl pyridine | 5 | do | 85 | N. |

See footnotes at end of table.

*Table 1—Continued*

| Vinyl Compound | Amount of Catalyst, Percent [1] | Solvent | Temp., °C. | Degree of Polymerization |
|---|---|---|---|---|
| Methyl methacrylate | 5 | None | 85 | None. |
| Ethyl methacrylate | 5 | ---do----- | 85 | Do. |
| n-Butyl methacrylate | 5 | ---do----- | 85 | Do. |
| Methyl acrylate | 5 | ---do----- | 85 | Do. |
| Ethyl acrylate | 5 | ---do----- | 85 | Do. |
| Cellosolve acrylate | 5 | ---do----- | 85 | Do. |
| Methylvinyl ketone | 5 | ---do----- | 85 | Do. |
| Allyl acetate | 5 | ---do----- | 85 | Do. |
| Allyl alcohol | 5 | ---do----- | 85 | Do. |
| Allyl amine | 5 | ---do----- | 85 | Do. |
| Allylidene diacetate | 5 | ---do----- | 85 | Do. |
| Diethyl fumarate | 5 | ---do----- | 85 | Do. |
| Diallyl maleate | 5 | ---do----- | 85 | Do. |
| Maleic anhydride | 5 | ---do----- | 85 | Do. |
| Acrylonitrile | 5 | ---do----- | 85 | Do. |
| Vinyl bromide | 5 | ---do----- | 85 | Do. |
| Trichloroethylene | 5 | ---do----- | 85 | Do. |

[1] Percent by wt. based on weight of total reaction mixture.
[2] None and methyl ethyl ketone.
[3] None and ethyl acetate.
N—None; S—Slow; M—Moderate; MF—Moderately Fast; F—Fast; RT—Room Temperature.

EXAMPLE 2

In this example, a 1:1 molar mixture of styrene and methyl methacrylate was subjected to polymerization in a manner as described in Example 1 using 3% by weight anhydrous lithium perchlorate catalyst. The polymerization was conducted at a temperature of 60° C. for a period of 4 hours and, at the end of this time, the polymer obtained was purified and analyzed for carbon and hydrogen. The carbon and hydrogen content of the polymer was found to be 90.4% by weight carbon and 7.7% by weight hydrogen as compared with values of 92.3% by weight carbon and 7.7% by weight hydrogen calculated for a pure styrene polymer. Thus, the polymer obtained in this example was substantially all polystyrene and the methyl methacrylate vinyl monomer, which was found in Example 1 to not be polymerizable using lithium perchlorate as the catalyst, was not polymerized along with the styrene. The methyl methacrylate was merely an inert material and did not affect the polymerization of the styrene vinyl monomer.

EXAMPLE 3

In this example, 1:1 molar mixtures of various polymerizable vinyl monomers were copolymerized in the absence of a solvent. The comonomers and finely divided anhydrous lithium perchlorate were heated at a temperature of 85° C. The solid copolymers formed in approximately 10 minutes in yields greater than 80%. The copolymers made in this manner included vinyloxy ethanol copolymerized with acrylamide, acrylamide copolymerized with methacrylamide, acrylamide copolymerized with N-methylol acrylamide, vinyl n-butyl ether copolymerized with vinyl-isobutyl ether, and acrylamide copolymerized with vinyl formate.

In general, the polymer products obtained in the polymerization process of this invention are solids and have properties similar to the properties of the same polymers obtained using other polymerization catalysts. For example, the polymers of the vinyl ethers had average molecular weights as high as 20,000 and the polymers of styrene had average molecular weights of 300,000 to 400,000. The polymer products obtained in the process of this invention can be used in the usual manner according to procedures well known to those skilled in the art, for example, in making injection molded and compression molded articles, and in other forms such as films, surface coatings, monofilaments, and the like.

Reasonable variation and modification of the invention as described are possible, the essence of which is that there have been provided (1) methods for polymerizing certain vinyl monomers to obtain polymeric materials in an improved manner and (2) a polymerization catalyst composition comprising lithium perchlorate.

I claim:

1. A process for the polymerization of a vinyl monomer having a pi electron density above the pi electron density of ethylene to form a polymeric material, said process comprising contacting said vinyl monomer with a catalyst consisting essentially of lithium perchlorate under polymerization conditions and recovering said polymeric material as product of the process.

2. A process for the polymerization of a vinyl monomer having a pi electron density above the pi electron density of ethylene to form a polymeric material, said process comprising contacting said vinyl monomer with a catalyst consisting essentially of lithium perchlorate at a temperature in the range of from −20° C. to 150° C. for a period of time sufficient to form said polymeric material and recovering said polymeric material as product of the process.

3. A process for the polymerization of a vinyl monomer having a pi electron density above the pi electron density of ethylene to form a polymeric material, said process comprising contacting said vinyl monomer with a catalyst consisting essentially of lithium perchlorate at a temperature in the range of from 0° C. to 100° C. for a period of time sufficient to form said polymeric material and recovering said polymeric material as product of the process.

4. A process for the polymerization of a vinyl monomer having a pi electron density above the pi electron density of ethylene to form a polymeric material, said process comprising contacting said vinyl monomer with a catalyst consisting essentially of lithium perchlorate at a temperature in the range of from −20° C. to 150° C. at atmospheric pressure for a period of time less than 96 hours and recovering said polymeric material as product of the process.

5. A process for the polymerization of a vinyl monomer having a pi electron density above the pi electron density of ethylene to form a polymeric material, said process comprising contacting said vinyl monomer with a catalyst consisting essentially of lithium perchlorate at a temperature in the range of from −20° C. to 150° C. at superatmospheric pressure for a period of time less than 96 hours and recovering said polymeric material as product of the process.

6. A process for the polymerization of a vinyl compound having a high pi electron density to form a polymeric material, said process comprising contacting a polymerization reactant comprising a vinyl compound having a pi electron density above the pi electron density of ethylene in admixture with unpolymerizable compounds with a catalyst consisting essentially of lithium perchlorate under polymerization conditions and recovering said polymeric material of said vinyl compound having a pi electron density above the pi electron density of ethylene as product of the process.

7. The process of claim 6 wherein said unpolymerizable compounds are vinyl compounds having pi electron densities below the pi electron density of ethylene.

8. The process of claim 6 wherein said unpolymerizable compounds comprise an inert reaction medium.

9. A process for selectively polymerizing vinyl compounds to form high molecular weight polymers, said method comprising contacting a polymerization reactant containing vinyl compounds having pi electron densities above and below the pi electron density of ethylene with a catalyst consisting essentially of lithium perchlorate under polymerization conditions and recovering a polymer of vinyl compounds having high pi electron density as product.

10. A process for the copolymerization of vinyl compounds having pi electron densities above the pi electron density of ethylene to form copolymers thereof, said process comprising contacting a polymerization reactant comprising a mixture of said vinyl compounds with a catalyst consisting essentially of lithium perchlorate under polymerization conditions and recovering said copolymer as product of the process.

11. The process of claim 1 wherein said vinyl monomer is styrene.

12. The process of claim 1 wherein said vinyl monomer is vinyl isobutyl ether.

13. The process of claim 1 wherein said vinyl monomer is 1-methoxybutadiene.

14. The process of claim 1 wherein said vinyl monomer is 2-vinyl oxy ethanol.

15. The process of claim 1 wherein said vinyl monomer is 4-vinyl pyridine.

16. The process of claim 1 wherein said vinyl monomer is methacrylamide.

17. The process of claim 1 wherein said vinyl monomer is vinyl formate.

18. The process of claim 10 wherein one of said vinyl compounds is vinyl oxy ethanol and the other of said vinyl compounds is acrylamide.

References Cited by the Examiner

UNITED STATES PATENTS

| 2,068,424 | 1/1937 | Mark et al. | 260—92.8 |
| 2,363,836 | 11/1944 | D'Alelio | 260—93.5 |
| 2,378,195 | 6/1945 | D'Alelio | 260—88.2 |
| 2,403,709 | 7/1946 | Dickey et al. | 260—610 |
| 2,450,682 | 10/1948 | Nordlander | 260—869 |
| 2,821,521 | 1/1958 | Price | 260—78 |
| 2,868,772 | 1/1959 | Ray et al. | 260—94.9 |

OTHER REFERENCES

Losev et al.: CA 52, 5025g (1958).

D'Alelio: "Fundamental Principles of Polymerization," pages 333–41, John Wiley & Sons, Inc., New York (1952).

Schildknecht: "Vinyl and Related Polymers," pp. 92–110, John Wiley & Sons, Inc., New York (1952).

JOSEPH L. SCHOFER, *Primary Examiner.*